(12) United States Patent
Miyake et al.

(10) Patent No.: US 10,818,934 B2
(45) Date of Patent: *Oct. 27, 2020

(54) GAS DIFFUSION ELECTRODE

(71) Applicant: TORAY INDUSTRIES, INC., Tokyo (JP)

(72) Inventors: Toru Miyake, Otsu (JP); Masamichi Utsunomiya, Otsu (JP); Yasuaki Tanimura, Otsu (JP); Kazuyo Shigeta, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 206 days.

This patent is subject to a terminal disclaimer.

(21) Appl. No.: 16/064,234

(22) PCT Filed: Dec. 16, 2016

(86) PCT No.: PCT/JP2016/087624
§ 371 (c)(1),
(2) Date: Jun. 20, 2018

(87) PCT Pub. No.: WO2017/110690
PCT Pub. Date: Jun. 29, 2017

(65) Prior Publication Data
US 2019/0027761 A1    Jan. 24, 2019

(30) Foreign Application Priority Data
Dec. 24, 2015   (JP) .................................. 2015-251254

(51) Int. Cl.
*H01M 4/86* (2006.01)
*H01M 4/96* (2006.01)
(Continued)

(52) U.S. Cl.
CPC ............. *H01M 4/96* (2013.01); *H01M 4/861* (2013.01); *H01M 4/8605* (2013.01);
(Continued)

(58) Field of Classification Search
None
See application file for complete search history.

(56) References Cited

U.S. PATENT DOCUMENTS 6,127,059 A    10/2000  Kato
7,150,934 B2   12/2006  Yoshida et al.
(Continued)

FOREIGN PATENT DOCUMENTS

CN    102341943 A    2/2012
JP    2000123842 A   4/2000
(Continued)

OTHER PUBLICATIONS

International Search Report and Written Opinion for International Application No. PCT/JP2016/087624, dated Feb. 14, 2017, 6 pages.
(Continued)

*Primary Examiner* — Haroon S. Sheikh
(74) *Attorney, Agent, or Firm* — RatnerPrestia

(57) ABSTRACT

A gas diffusion electrode has a microporous layer on at least one surface of an electrical conducting porous substrate. The microporous layer has at least a first microporous layer in contact with the electrical conducting porous substrate, and a second microporous layer. The gas diffusion electrode has a pore size distribution with a peak at least in a first region of 10 μm or more and 100 μm or less, a second region of 0.2 μm or more and less than 1.0 μm, and a third region of 0.050 μm or more and less than 0.2 μm. The total volume of the pores in the second region is 10% or more and 40% or less of the total volume of the pores in the first region, and the total volume of the pores in the third region is 40% or more
(Continued)

and 80% or less of the total volume of the pores in the second region.

11 Claims, 6 Drawing Sheets

(51) Int. Cl.
*H01M 8/14* (2006.01)
*H01M 8/1018* (2016.01)
*H01M 8/1004* (2016.01)

(52) U.S. Cl.
CPC ....... *H01M 4/8652* (2013.01); *H01M 4/8657* (2013.01); *H01M 4/8673* (2013.01); *H01M 8/141* (2013.01); *H01M 8/1004* (2013.01); *H01M 2008/1095* (2013.01)

(56) References Cited

U.S. PATENT DOCUMENTS

| | | | |
|---|---|---|---|
| 7,749,639 | B2 | 7/2010 | Ichikawa et al. |
| 8,641,939 | B2 | 2/2014 | Chida et al. |
| 9,570,758 | B2 | 2/2017 | Gomi et al. |
| 2006/0046926 | A1 | 3/2006 | Ji et al. |
| 2007/0224479 | A1 | 9/2007 | Tadokoro et al. |
| 2011/0171563 | A1 | 7/2011 | Waki et al. |
| 2011/0318661 | A1 | 12/2011 | Uensal et al. |
| 2014/0011118 | A1 | 1/2014 | Lee et al. |
| 2014/0134516 | A1 | 5/2014 | Okuyama et al. |
| 2015/0372332 | A1 | 12/2015 | Okano et al. |
| 2017/0237079 | A1 | 8/2017 | Tanimura et al. |

FOREIGN PATENT DOCUMENTS

| | | | |
|---|---|---|---|
| JP | 2000182626 | A | 6/2000 |
| JP | 2001160399 | A | 6/2001 |
| JP | 2002352807 | A | 12/2002 |
| JP | 3382213 | B2 | 3/2003 |
| JP | 2004281363 | A | 10/2004 |
| JP | 2006004879 | A | 1/2006 |
| JP | 2006155921 | A | 6/2006 |
| JP | 2007214019 | A | 8/2007 |
| JP | 3773325 | B2 | 2/2008 |
| JP | 2008300195 | A | 12/2008 |
| JP | 2009016171 | A | 1/2009 |
| JP | 2009238376 | A | 10/2009 |
| JP | 2010070433 | A | 4/2010 |
| JP | 2010267539 | A | 11/2010 |
| JP | 4780814 | B2 | 9/2011 |
| JP | 2011233274 | A | 11/2011 |
| JP | 2011243314 | A | 12/2011 |
| JP | 2012033458 | A | 2/2012 |
| JP | 2012054111 | A | 3/2012 |
| JP | 2012204142 | A | 10/2012 |
| JP | 2013065413 | A | 4/2013 |
| JP | 2014011163 | A | 1/2014 |
| JP | 2014232691 | A | 12/2014 |
| JP | 2015195111 | A | 11/2015 |
| WO | 03081700 | A1 | 10/2003 |
| WO | 2007037084 | A1 | 4/2007 |
| WO | 2010035815 | A1 | 4/2010 |
| WO | 2012172994 | A1 | 12/2012 |
| WO | 2014126002 | A1 | 8/2014 |
| WO | 2016060043 | A1 | 4/2016 |

OTHER PUBLICATIONS

International Search Report and Written Opinion for International Application No. PCT/JP2016/087626, dated Mar. 7, 2017, 9 pages.
International Search Report and Written Opinion for International Application No. PCT/JP2016/087625, dated Mar. 14. 2017, 6 pages.
Non Final Office Action for U.S. Appl. No. 15/777,447, dated Jan. 27, 2020, 16 pages.
Non Final Office Action for U.S. Appl. No. 16/064,237, dated Mar. 6. 2020, 13 pages.

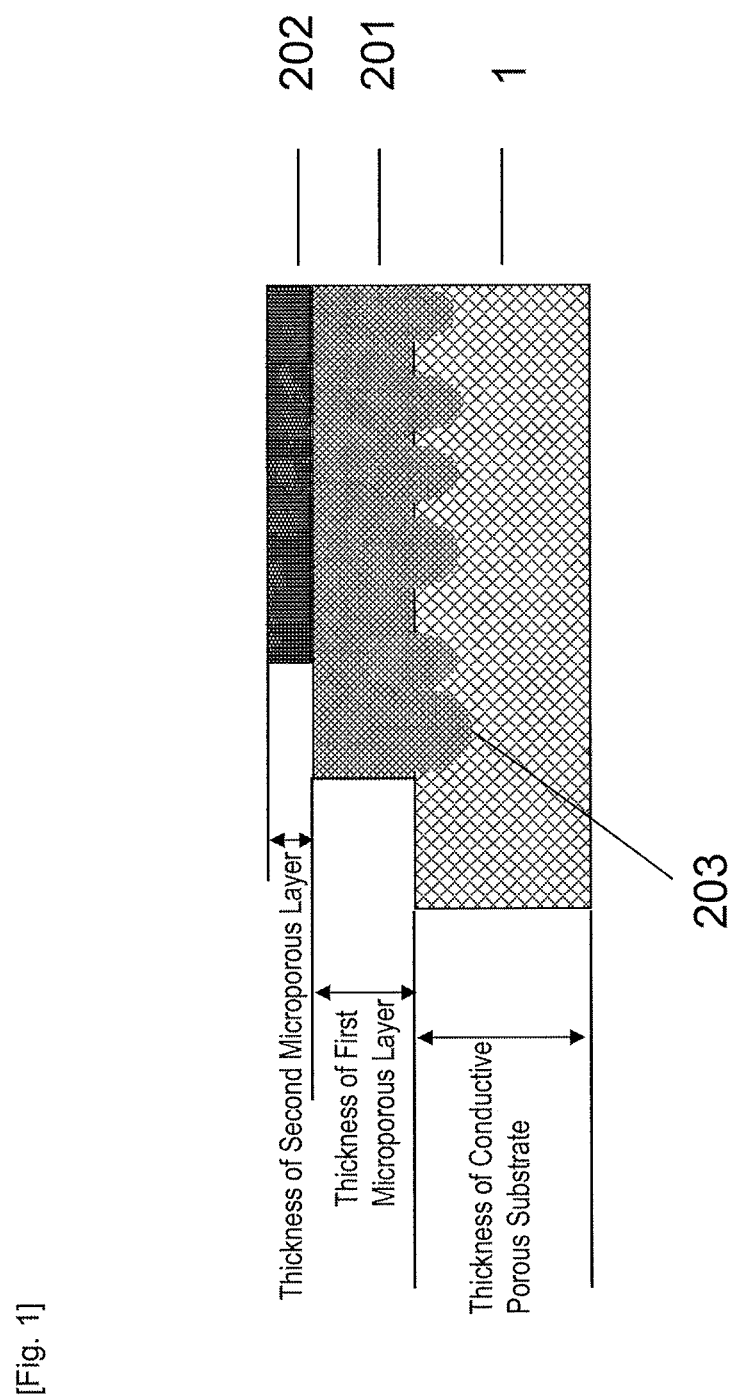
[Fig. 1]

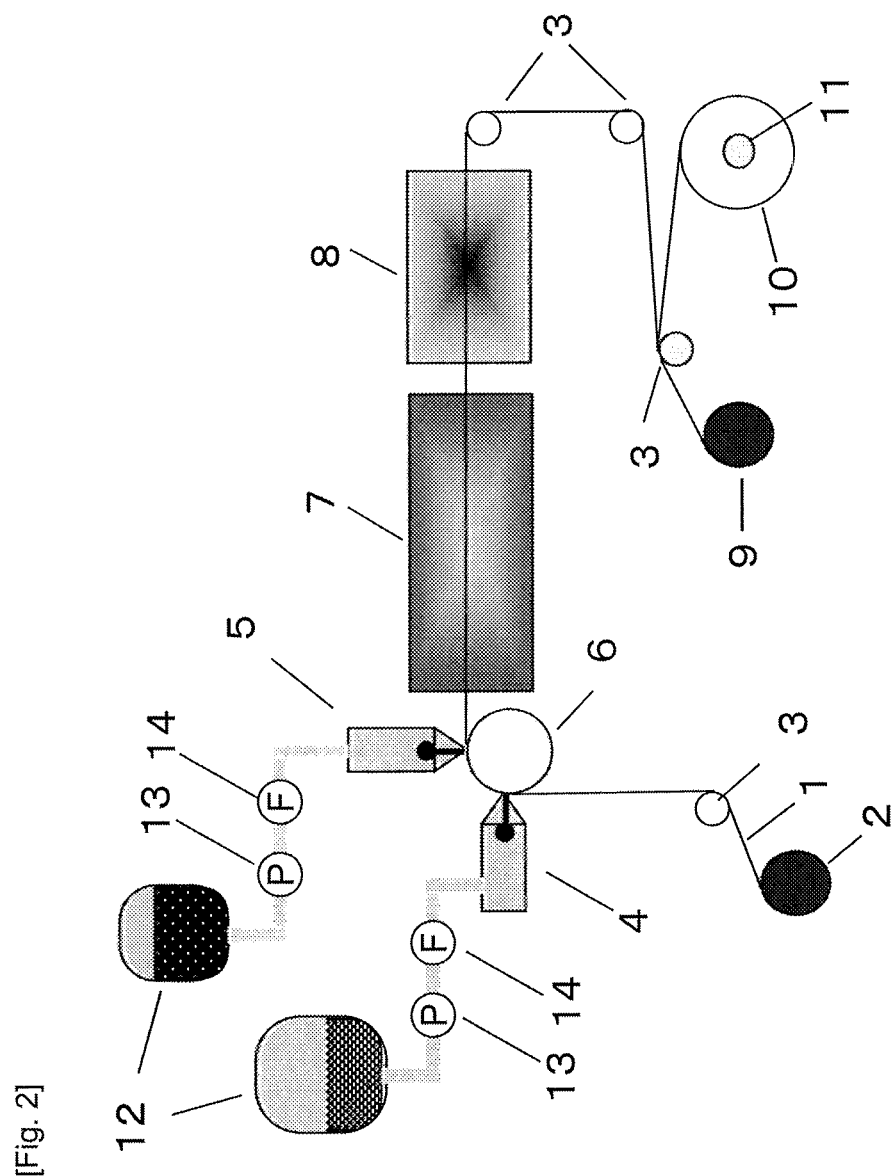
[Fig. 2]

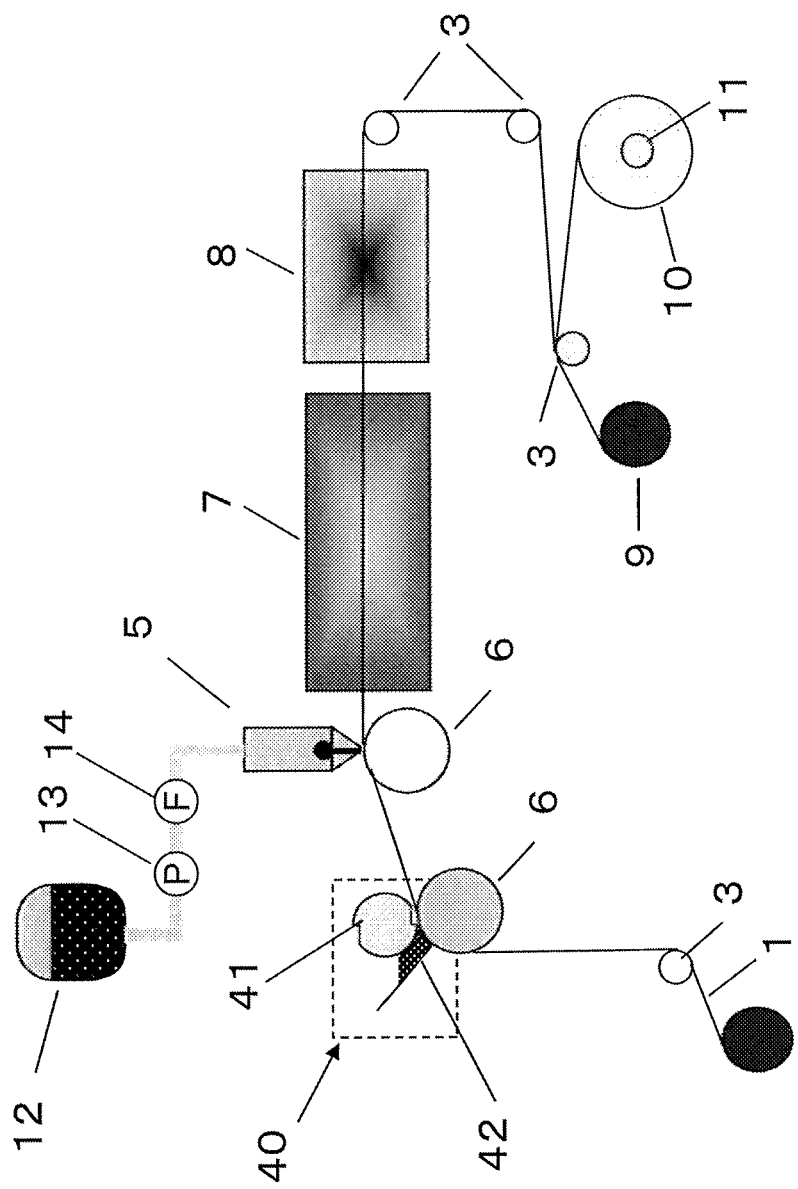
[Fig. 3]

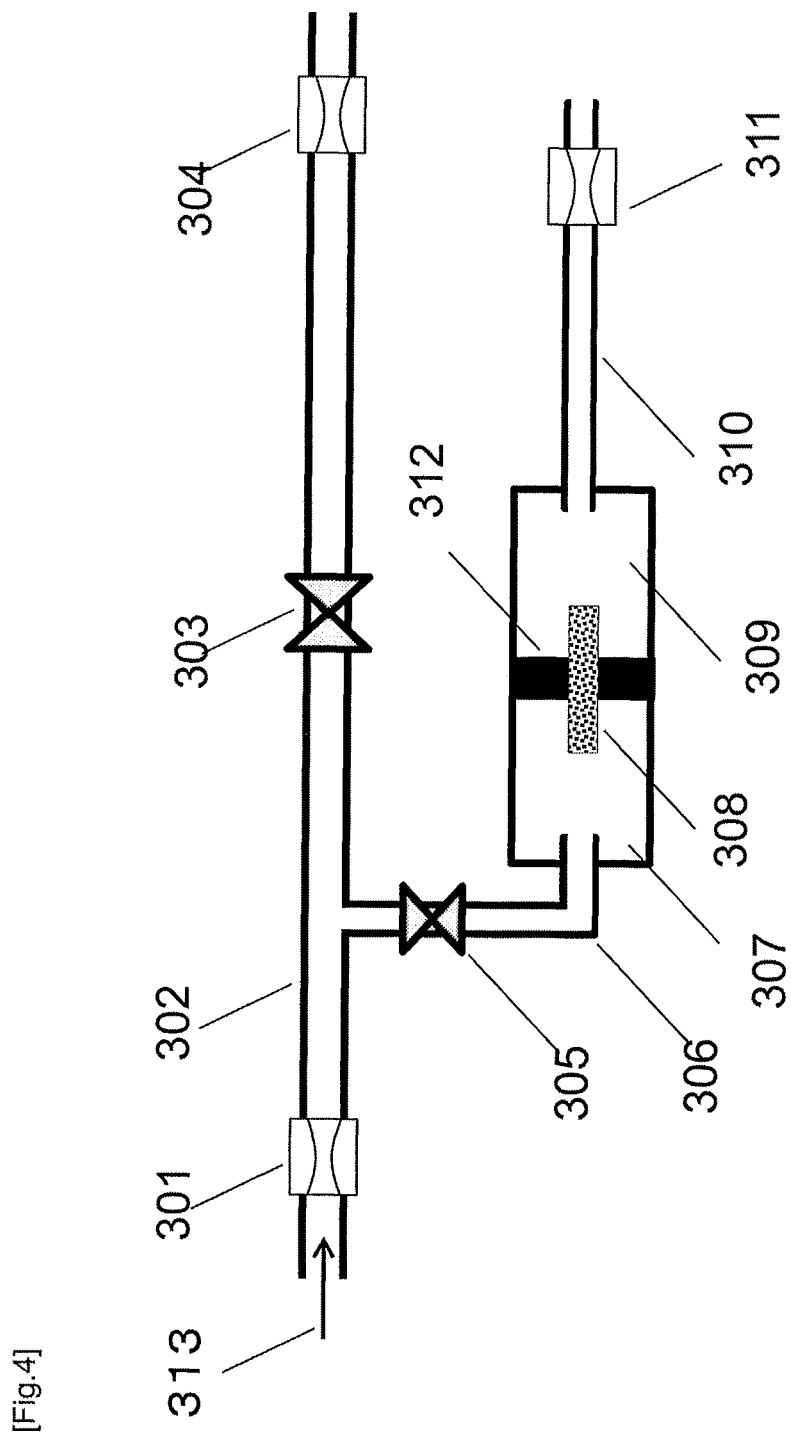

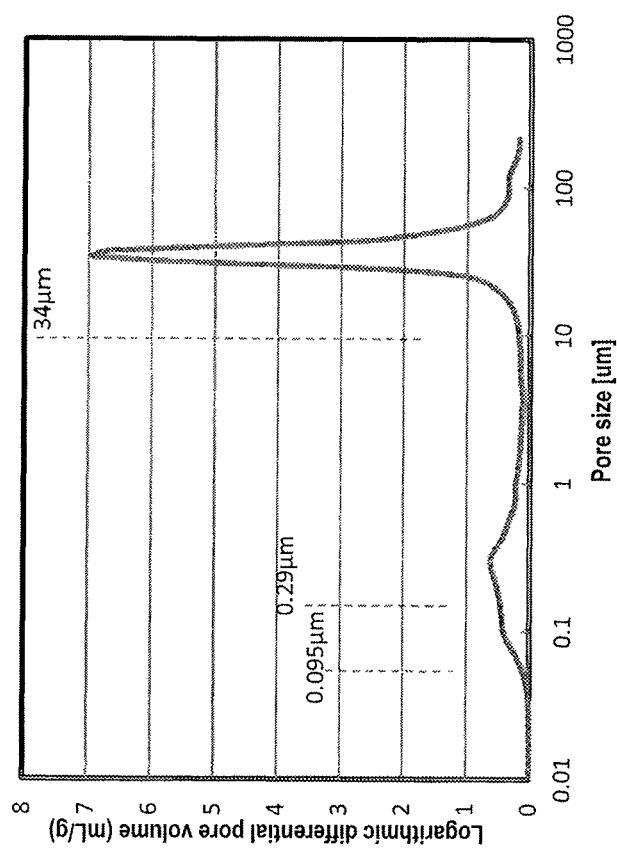
[Fig.5]

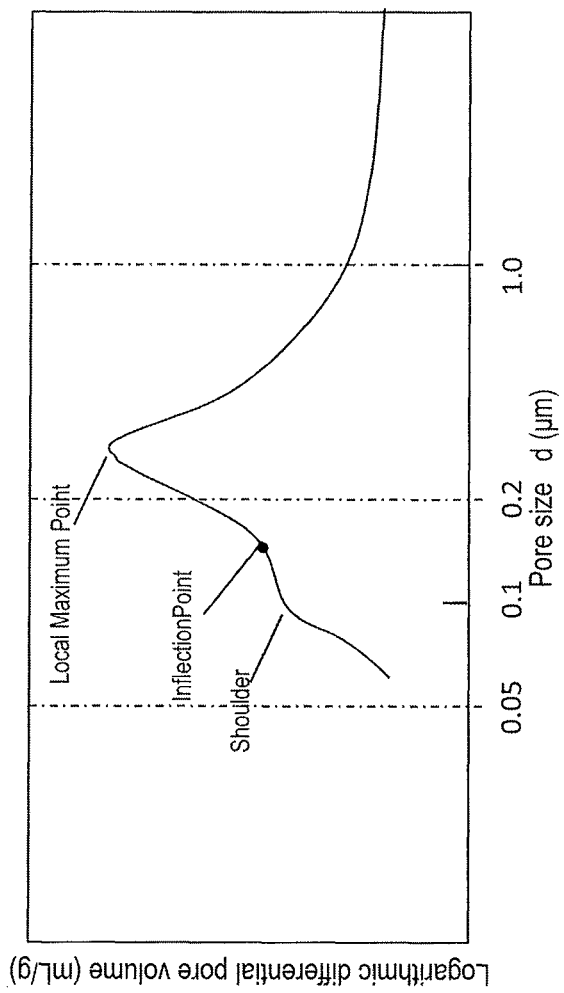
[Fig.6]

GAS DIFFUSION ELECTRODE

CROSS REFERENCE TO RELATED APPLICATIONS

This is the U.S. National Phase application of PCT/JP2016/087624, filed Dec. 16, 2016, which claims priority to Japanese Patent Application No. 2015-251254, filed Dec. 24, 2015, the disclosures of these applications being incorporated herein by reference in their entireties for all purposes.

TECHNICAL FIELD OF THE INVENTION

A fuel cell is a mechanism in which energy resulting from the formation of water through a reaction of hydrogen and oxygen is electrically extracted, and its popularization as clean energy has been expected since fuels cells have a high energy efficiency and only discharge water. The present invention relates to a gas diffusion electrode used in a fuel cell. Among fuel cells, the present invention particularly relates to a gas diffusion electrode used in a polymer electrolyte fuel cell which is used as a power source in a fuel cell vehicle, for instance.

BACKGROUND OF THE INVENTION

An electrode used in a polymer electrolyte fuel cell is placed between two bipolar plates in the polymer electrolyte fuel cell, and has a structure composed of a polymer electrolyte membrane, and on the both surfaces of the polymer electrolyte membrane, a catalyst layer formed on the surface of the polymer electrolyte membrane, and a gas diffusion layer formed on the outer side of the catalyst layer. A gas diffusion electrode has been widely distributed as an individual member for forming the gas diffusion layer in the electrode. Examples of the performance demanded in this gas diffusion electrode include the gas diffusivity, the electrical conductivity for collecting electricity generated in the catalyst layer, and the water removal performance for removing efficiently water generated on the surface of the catalyst layer. In order to obtain the gas diffusion electrode described above, an electrical conducting porous substrate equipped with the gas diffusion performance and the electrical conductivity is generally used.

As the electrical conducting porous substrate, specifically, a carbon felt, a carbon paper or a carbon cloth composed of a carbon fiber is used. Among these, the carbon paper is considered to be the most preferable in terms of the mechanical strength, for example.

Because the fuel cell is a system in which energy resulting from the formation of water through a reaction of hydrogen and oxygen is extracted electrically, a large electrical stress, in other words, a large electrical current to be extracted to the outside of the cell causes the generation of a large amount of water (water vapor). This water vapor condenses into water drops at a low temperature. When pores of the gas diffusion electrode are blocked by the water drops, the gas feed (oxygen or hydrogen) to the catalyst layer decreases. When all the pores are blocked eventually, the electricity generation stops (this phenomenon is called flooding).

In order to avoid this flooding as much as possible, the water removal performance is required in the gas diffusion electrode. As a means to improve this water removal performance, a gas diffusion electrode substrate formed by an electrical conducting porous substrate subjected to a hydrophobic treatment is usually used, resulting in better hydrophobicity.

When the above electrical conducting porous substrate subjected to the hydrophobic treatment is used as is as the gas diffusion electrode, large water drops form upon the condensation of water vapor because of the rough fiber texture, and the flooding is likely to occur. Therefore, a layer called microporous layer is sometimes used. The microporous layer is formed by coating the electrical conducting porous substrate subjected to the hydrophobic treatment with an ink in which electrical conducting fine particles such as carbon black are dispersed, and drying and sintering the substrate. The microporous layer also has a role of a makeover that prevents the transfer of the roughness of the electrical conducting porous substrate onto the electrolyte membrane.

On the other hand, in fuel cells for fuel cell vehicles, the fuel cell performance under the high-temperature operation condition is also demanded. At a high temperature, the electrolyte membrane gets easily dry, causing the decrease in the ion conductivity of the electrolyte membrane, and therefore the decrease in the fuel cell performance (this phenomenon is called dry-out).

PATENT DOCUMENTS

In order to provide the microporous layer with the hydrophobicity and prevent the flooding, it is known that a fluororesin is contained as a hydrophobic polymer (Patent Documents 1, 2, 3). In addition to the above, the microporous layer also has a role to prevent the penetration of the catalyst layer into the gas diffusion electrode substrate of the rough texture (Patent Document 4).

In order to prevent the flooding and the dry-out described above, the control of the distribution of the pore sizes on the gas diffusion electrode is one effective way, and this technique is described in Patent Document 5.

Patent Document 1: U.S. Pat. No. 3,382,213
Patent Document 2: Japanese Patent Laid-open Publication No. 2002-352807
Patent Document 3: Japanese Patent Laid-open Publication No. 2000-123842
Patent Document 4: U.S. Pat. No. 3,773,325
Patent Document 5: U.S. Pat. No. 4,780,814

SUMMARY OF THE INVENTION

However, with the techniques disclosed in the above Patent Documents 1 to 5, it was difficult to achieve both the anti-flooding characteristic and the anti-dry-out characteristic, and to assure high performance in a wide temperature range for the application that requires a large output such as in the one installed in a fuel cell vehicle.

Furthermore, for the popularization of a fuel cell or a fuel cell vehicle, it is essential to produce a high-performing fuel cell at a low cost. The lower cost for all the fuel cell members is thus required, including the gas diffusion electrode. The present invention provides a gas diffusion electrode which overcomes the above drawbacks of the prior art, achieves both the anti-dry-out characteristic and anti-flooding characteristic, shows good fuel cell performance as a gas diffusion electrode, and is low in cost.

In order to solve the above problems, the gas diffusion electrode of the present invention has a following structure (1) or (2). Namely, (1) a gas diffusion electrode having a microporous layer on at least one surface of an electrical conducting porous substrate, wherein
the microporous layer has at least a first microporous layer in contact with the electrical conducting porous substrate, and a second microporous layer,
the gas diffusion electrode has a pore size distribution with a peak at least in a first region of 10 μm or more and 100 μm or less, a second region of 0.2 μm or more and less than 1.0 μm, and a third region of 0.050 μm or more and less than 0.2 μm, and the total volume of the pores in the second region is 10% or more and 40% or less of the total volume of the pores in the first region, and the total volume of the pores in the third region is 40% or more and 80% or less of the total volume of the pores in the second region,
or,
(2) a gas diffusion electrode having a microporous layer on at least one surface of an electrical conducting porous substrate, wherein
the microporous layer has at least a first microporous layer in contact with the electrical conducting porous substrate, and a second microporous layer, and the first microporous layer contains carbon black having a structure index of 3.0 or more, and the second microporous layer contains carbon black having a structure index of less than 3.0.

The invention described as (1) is referred to as the first aspect of the present invention, and the invention described as (2) is referred to as the second aspect of the present invention. The first aspect and the second aspect are combined to be referred to as the present invention.

In the first aspect of the present invention, it is preferred that the total volume of the pores in the first region is 1.2 mL/g or more and 2.0 mL/g or less, the total volume of the pores in the second region is 0.2 mL/g or more and 0.4 mL/g or less, and the total volume of the pores in the third region is 0.15 mL/g or more and 0.30 mL/g or less.

In the first aspect of the present invention, it is preferred that the first microporous layer and the second microporous layer contain carbon black.

In the first aspect of the present invention, it is preferred that the carbon black in the first microporous layer has a structure index of 3.0 or more, and the carbon black in the second microporous layer has a structure index of less than 3.0.

In the present invention, the first microporous layer has preferably a thickness of 10 μm or more and less than 50 μm, and the second microporous layer has preferably a thickness of 0.1 μm or more and less than 10 μm, and the total thickness of the microporous layer is preferably more than 10 μm and 60 μm or less.

In the present invention, when the carbon black is contained, the ash content of the carbon black is preferably 0.1% by mass or less.

The present invention, the gas diffusivity in the thickness direction is preferably 30% or more.

In the present invention, the gas diffusivity in the in-plane direction is preferably 25 cc/min or more.

In the present invention, it is preferred that the electrical conducting porous substrate is a carbon paper, and that the carbon paper has preferably a thickness of 220 μm or less.

In the present invention, it is preferred that the second microporous layer is located at the outermost surface and has a surface roughness of 6 μm or less.

The use of the gas diffusion electrode of the present invention can provide a low-priced fuel cell which shows high gas diffusivity, good water removal performance, and high fuel cell performance in a wide temperature range thanks to the achievement of both the anti-flooding characteristic and anti-dry-out characteristic.

BRIEF DESCRIPTION OF THE DRAWINGS

FIG. 1 is a schematic view illustrating the structure of the gas diffusion electrode of the present invention.

FIG. 2 is a schematic layout illustrating a preferable aspect example of a production apparatus for the gas diffusion electrode of the present invention.

FIG. 3 is a schematic layout illustrating another preferable aspect example of a production apparatus for the gas diffusion electrode of the present invention.

FIG. 4 is a schematic view illustrating an apparatus for measuring the gas diffusivity in the in-plane direction.

FIG. 5 is an example of the log differentiation of the pore volume distribution of the gas diffusion electrode of the present invention obtained by Mercury porosimeter.

FIG. 6 is an example of the log differentiation of the pore volume distribution.

DETAILED DESCRIPTION OF EMBODIMENTS OF THE INVENTION

The gas diffusion electrode of the present invention has a microporous layer on at least one surface of an electrical conducting porous substrate. The microporous layer has at least a first microporous layer in contact with the electrical conducting porous substrate, and a second microporous layer.

In such a gas diffusion electrode of the present invention, the electrical conducting porous substrate will be explained first.

In polymer electrolyte fuel cells, the gas diffusion electrode is required to have high gas diffusivity for allowing a gas supplied from the bipolar plate to be diffused into the catalyst and high water removal performance for discharging water generated by the electrochemical reaction to the bipolar plate, as well as high electrical conductivity for extracting the generated electric current. For this purpose, in the gas diffusion electrode, a substrate composed of a porous material which has electrical conductivity and usually has a peak of the pore size in the region of 10 μm or more and 100 μm or less, namely an electrical conducting porous substrate is used.

The pore size and its distribution can be determined by the pore size distribution measurement by Mercury porosimeter. For the pore size measurement of the electrical conducting porous substrate, the electrical conducting porous substrate may be directly used, or the gas diffusion electrode may be used. When the gas diffusion electrode is used for the measurement, the through-plane cross section of the gas diffusion electrode (hereinafter, 'through-plane' indicates a thickness direction, and the through-plane cross section indicates a cross section parallel to the thickness direction) is observed by a scanning electron microscopy (SEM) to confirm the structure of each layer, and thus the approximate diameter of the pore portion is determined by an SEM image. Then, the pore size peak of each layer obtained by Mercury porosimeter is corresponded to the approximate value obtained from the SEM image. The pore size for each layer is thus determined. This method allows for efficient determination of the pore size of the electrical conducting porous substrate, the pore size of the first microporous layer, and the pore size of the second microporous layer.

As the electrical conducting porous substrate, it is preferred to use, as specific examples, a carbon fiber-containing porous substrate such as carbon fiber woven fabric, carbon fiber papermaking substrate, carbon fiber non-woven fabric, carbon felt, carbon paper, and carbon cloth, or a metal porous substrate such as sinterfoamed metal, metal mesh and expanded metal. Among these, a porous substrate such as carbon fiber-containing carbon felt, carbon paper, and carbon cloth is preferably used in terms of its excellent corrosion resistance. Furthermore, a substrate formed by bonding a carbon fiber papermaking substrate with carbide, namely a carbon paper is suitably used in terms of its property to absorb the dimension variation in the thickness direction of the electrolyte membrane, in other words, its excellent "spring property."

In the present invention, in order to improve the gas diffusivity of the gas diffusion electrode and thus maximize the fuel cell performance of the fuel cell, the porosity of the electrical conducting porous substrate is preferably 80% or more and, more preferably 85% or more and. The upper limit of the porosity is about 95%, which is the limit where the electrical conducting porous substrate can keep the structure.

As for the porosity of the electrical conducting porous substrate, a through-plane cross section in the thickness direction is cut out by an ion milling apparatus (produced by Hitachi High-Tech Solutions Corporation, IM4000, and its equivalent products can be used) and observed by a scanning electron microscopy (SEM). The pore portion and non-pore portion in contact with the cross section are binarized. Thus, the porosity (%) is defined as the ratio of the area of the pore portion to the total area. For the porosity measurement of the electrical conducting porous substrate, the electrical conducting porous substrate may be directly used, or the gas diffusion electrode may be used.

In addition, the gas diffusivity of the gas diffusion electrode can be also improved by thinning the thickness of the electrical conducting porous substrate such as a carbon paper. Therefore, the electrical conducting porous substrate such as a carbon paper has preferably a thickness of 220 μm or less, more preferably 150 μm or less, and further preferably 120 μm or less. The lower limit of the thickness of the electrical conducting porous substrate is preferably 70 μm in terms of the maintenance of the mechanical strength and easier handling during the production process.

In order to produce a gas diffusion electrode efficiently using such an electrical conducting porous substrate, it is preferred to unwind an electrical conducting porous substrate which has been wound continuously, and form a microporous layer continuously during the unwinding.

In the present invention, a substrate subjected to a hydrophobic treatment is suitably used as the electrical conducting porous substrate. The hydrophobic treatment is preferably carried out using a hydrophobic polymer such as fluororesin. Examples of the fluororesin contained in the electrical conducting porous substrate include PTFE (polytetrafluoroethylene) (e.g., "Teflon" (registered trademark)), FEP (tetrafluoroethylene-hexa fluoro propylene copolymer), PFA (perfluoroalkoxy fluoride resin), ETFE (ethylene-tetrafluoroethylene copolymer), PVDF (polyvinylidene fluoride), and PVF (polyvinyl fluoride). The PTFE or FEP which shows strong hydrophobicity is preferred.

The amount of the hydrophobic polymer is not particularly limited, but is preferably about 0.1% by mass or more and 20% by mass or less in the total 100% by mass of the electrical conducting porous substrate. This preferred range exhibits sufficient hydrophobicity and also results in a low possibility of the blockage of the pores which are the gas diffusion pathway or the water removal pathway and of the increase in the electrical resistance.

As the method for subjecting the electrical conducting porous substrate to a hydrophobic treatment, in addition to the generally known treatment technique of dipping the electrical conducting porous substrate in the hydrophobic polymer-containing dispersion, a coating technique of coating the electrical conducting porous substrate with the hydrophobic polymer by, for example, die coating or spray coating can be applied. A treatment by a dry process such as sputtering of a fluororesin can be also applied. After the hydrophobic treatment, a drying process, and further a sintering process may be added as necessary.

The microporous layer is now explained. The present invention has a microporous layer on at least one surface of the electrical conducting porous substrate. The microporous layer has at least a first microporous layer in contact with the electrical conducting porous substrate, and a second microporous layer. The structure of the microporous layer is not particularly limited as long as it has at least two layers or more, but particularly preferably is a two-layer structure of a first microporous layer in contact with the electrical conducting porous substrate, and a second microporous layer at the outermost surface in contact with the first microporous layer. The common aspects in the microporous layer are explained first.

The microporous layer is a layer containing an electrical conducting fine particle such as carbon black, carbon nanotube, carbon nanofiber, chopped carbon fiber, graphene, and graphite. The carbon black is suitably used as the electrical conducting fine particle in terms of its low cost, safety and quality stability of the products. In other words, in the present invention, both the first microporous layer and the second microporous layer preferably contain carbon black. As the carbon black contained in the first microporous layer and the second microporous layer, acetylene black is suitably used because the amount of impurities is small and the catalyst activity is unlikely to decrease. An indication of the impurity content in the carbon black is, for example, the ash content. The carbon black having an ash content of 0.1% by mass or less is preferably used. A smaller ash content in the carbon black is preferred, and the ash content of 0% by mass in the carbon black, in other words, the carbon black which does not have any ash content is particularly preferred.

In addition, the microporous layer is required to have properties such as electrical conductivity, gas diffusivity, water removal performance, moisture retention property, or thermal conductivity as well as strong acid resistance on the anode side and the oxidation resistance on the cathode side in the fuel cell. Therefore, the microporous layer preferably contains a hydrophobic polymer such as a fluororesin in addition to electrical conducting fine particles. Examples of the fluororesin contained in the microporous layer include, PTFE, FEP, PFA, and ETFA, just like the fluororesin suitably used to make the electrical conducting porous substrate hydrophobic. PTFE or FEP is preferred in terms of its particularly high hydrophobicity.

In order to obtain the gas diffusion electrode having a microporous layer, an ink forming a microporous layer, namely an ink for microporous layer formation (hereinafter, referred to as ink) is generally coated on the electrical conducting porous substrate. The ink usually contains dispersion medium such as water or alcohol as well as the above electrical conducting fine particles. As a dispersant for allowing for the dispersion of the electrical conducting fine particles, a surfactant for example is often blended. When the microporous layer contains a hydrophobic polymer, it is preferred that the ink contains the hydrophobic polymer in advance.

As a method for forming a microporous layer on the electrical conducting porous substrate, a transfer method is known, in which an ink is first coated on a substrate such as a PET film, and its microporous layer side is bonded by compression on the electrical conducting porous substrate, and then the substrate film is removed. However, the transfer method makes the production process complicated, and a sufficient bonding between the electrical conducting porous substrate and the microporous layer is not obtained in some cases. Therefore, the method of coating an ink on the electrical conducting porous substrate is preferred as the method for forming a microporous layer.

The concentration of the electrical conducting fine particles in the ink is, in terms of productivity, preferably 5% by mass or more, and more preferably 10% by mass or more. There is no upper limit in the concentration as long as the viscosity, dispersion stability of the electrical conducting particles, the coating performance of the ink and so on are suitable. When acetylene black is used as the electrical conducting fine particles, in the case of an aqueous ink, the concentration of the acetylene black in the ink has preferably an upper limit of about 25% by mass. In this preferred range, the reaggregation of the acetylene black, namely percolation does not occur, resulting in a low possibility of the impaired coating performance of the ink due to a sudden increase in the viscosity.

The microporous layer plays a role in (1) the protection of the catalysts, (2) the makeover effect that prevents the transfer of the rough surface of the electrical conducting porous substrate onto the electrolyte membrane, (3) the prevention of the condensation of the water vapor which produced in the cathode, etc. Among these, in order to exhibit the makeover effect, the microporous layer preferably has a certain thickness.

The present invention has, as the microporous layer, at least first microporous layer and a second microporous layer. The total thickness of the microporous layer is, considering the current roughness of the electrical conducting porous substrate, preferably larger than 10 μm and 60 μm or less as the drying membrane thickness. The total thickness of the microporous layer is the total thickness of the two layers when the microporous layer is formed of a first microporous layer and a second microporous layer, and is the total thickness of the three layers when the microporous layer is formed of three layers including the first microporous layer and the second microporous layer. The total thickness of the microporous layer of 10 μm or less can cause an insufficient effect of the makeover described above. The total thickness of more than 60 μm can decrease the gas diffusivity (permeability) of the gas diffusion electrode itself and increase the electrical resistance. In order to improve the gas diffusivity or reduce the electrical resistance, the total thickness of the microporous layer is preferably 50 μm or less, and more preferably 40 μm or less.

The total thickness of the microporous layer described herein means the total thickness of the microporous layer on one surface of the electrical conducting porous substrate on which the first microporous layer and the second microporous layer are disposed. Even when the electrical conducting porous substrate has a microporous layer on its both surfaces, the total thickness means the thickness of the microporous layer on one surface of the electrical conducting porous substrate with the first microporous layer and the second microporous layer disposed.

The thickness of the gas diffusion electrode or the electrical conducting porous substrate can be measured, using for example a micrometer, by adding a load of 0.15 MPa to the substrate. The thickness of the microporous layer can also be determined by subtracting the thickness of the electrical conducting porous substrate from the thickness of the gas diffusion electrode. Furthermore, when the microporous layer has a two-layer structure, the thickness of the second microporous layer is, as shown in FIG. 1 in which the second microporous layer is formed on the electrical conducting porous substrate with the first microporous layer formed thereon, the difference between the portion where the second microporous layer is formed and the portion where the second microporous layer is not formed. When a first microporous layer and a second microporous layer are formed on the substrate, the measurement method by a micrometer as described above is used for adjusting the thickness of each layer.

When the gas diffusion electrode has an electrical conducting porous substrate, a first microporous layer, and a second microporous layer, the thickness of each layer can be determined as follows: an ion milling apparatus such as IM4000 produced by Hitachi High-Tech Solutions Corporation is used to cut the gas diffusion electrode in the thickness direction, and then the thickness is measured from an SEM image of the through-plane cross section (the cross section in the thickness direction) observed by a scanning electron microscopy (SEM).

The ink is, as described above, prepared by dispersing electrical conducting fine particles with a dispersant. In order to disperse the electrical conducting fine particles, based on 100% by mass of the total content of the electrical conducting fine particles and the dispersant, it is preferred that the dispersant to be used for the dispersion is 0.1% by mass or more and 5% by mass or less. In order to have a long dispersion stability which prevents the increase in the ink viscosity as well as the liquid separation, it is also effective, and preferred in some cases, to increase the amount of the dispersant to be added.

As descried above, when the total thickness of the microporous layer as a coated membrane after the drying is bigger than 10 μm, the ink viscosity is preferably kept at least 1000 mPa·s or more. When the ink viscosity is smaller than this value; the ink can run the surface of the electrical conducting porous substrate, or the ink can flow into the pores of the electrical conducting porous substrate, causing a strike-through. On the other hand, when the ink viscosity is too high, the coating performance can decrease. Therefore, the upper limit is about 25 Pa·s. The ink viscosity is preferably 3000 mPa·s or more and 20 Pa·s or less, and more preferably 5000 mPa·s or more and 15 Pa·s or less. In the present invention, the formation of a first microporous layer is followed by coating an ink for forming a second microporous layer (hereinafter referred to as second ink) to form the second microporous layer. The viscosity of the second ink is preferably lower than that of the ink for forming the first microporous layer (hereinafter referred to as first ink), and the viscosity of 10 Pa·s or less is desirable.

In order to keep a high ink viscosity, it is effective to add a thickener. The thickener used herein can be a generally well-known thickener. For example, a methyl cellulose thickener, a polyethylene glycol thickener, or a polyvinyl alcohol thickener is suitably used.

For these dispersant and thickener, one same material can have the two functions, or a material suitable for each function can be selected too. When the thickener and dispersant are selected separately, it is preferred to choose ones which do not disturb the dispersion system of the electrical conducting fine particles and the dispersion system of the hydrophobic polymer, or fluororesin. The above dispersant and thickener are collectively referred to as a surfactant herein. In the present invention, the total amount of the surfactant is preferably 50 parts by mass or more of the mass of the electrical conducting fine particles added, more preferably 100 parts by mass or more and, further preferably 200 parts by mass or more. A preferred upper limit of the amount of the surfactant to be added is usually 500 parts by mass or less of the mass of the electrical conducting fine particles added. In this preferred range, vapor or decomposition gas is unlikely to occur in the later sintering process, and as a result, safety and productivity can be assured.

The coating of the ink onto the electrical conducting porous substrate can be carried out, using a variety of commercially available coating apparatuses. Examples of the coating styles which can be used include screen printing, rotary screen printing, spraying, intaglio printing, gravure printing, die coating, bar coating, blade coating, and knife-over-roll coater coating. The coating by a die coater is preferred because the coating amount can be quantified independently of the surface roughness of the electrical conducting porous substrate. When the gas diffusion electrode is incorporated in the fuel cell and as a result the smoothness of the coated surface is required for a better bonding with the catalyst layer, coating by a blade coater or a knife-over-roll coater is suitably used. The above-described coating methods are presented for the illustration purpose only, and the coating method is not necessarily restricted thereto.

The ink is coated and then as necessary dried to remove the dispersion medium in the ink (water in the case of an aqueous ink). The temperature of the drying after the coating is, when the dispersion medium is water, desirably a room temperature (about 20° C.) to 150° C. or less, more preferably 60° C. or more and 120° C. or less. The drying of the dispersion medium (for example, water). can be carried out together in the later sintering process.

After the ink is coated, sintering is generally carried out in order to remove the surfactant used in the ink and dissolve the hydrophobic polymer once to bond the electrical conducting fine particles.

The sintering temperature depends on the boiling point or decomposition temperature of the surfactant added, but the sintering is preferably carried out at 250° C. or more and 400° C. or less. When the sintering temperature is in this preferred range, the surfactant can be removed sufficiently while the possibility that the hydrophobic polymer decomposes is low.

In terms of productivity, the sintering duration is as short as possible, preferably within 20 minutes, more preferably within 10 minutes, and further preferably within 5 minutes. However, when the sintering is carried out in too short a period of time, the vapor and the decomposition product of the surfactant is rapidly produced. When the sintering is carried out in the air, there is a risk of ignition.

For the sintering temperature and duration, suitable temperature and duration are selected considering the melting point or decomposition temperature of the hydrophobic polymer as well as the decomposition temperature of the surfactant. The drying and sintering can be carried out individually after the first ink coating and after the second ink coating, but as explained later, preferably carried out collectively after the first ink coating and the second ink coating.

In the present invention, at least two layers or more of the microporous layers are laminated at least one surface of the electrical conducting porous substrate. A microporous layer in contact with the electrical conducting porous substrate is referred to as first microporous layer, and when viewed from the electrical conducting porous substrate side, a microporous layer laminated on the outer side of the first microporous layer is referred to as second microporous layer.

The microporous layer is explained more in detail with reference to FIG. 1.

As described above, in the first aspect of the present invention, the pore size distribution of the gas diffusion electrode has a peak at least in a first region of 10 μm or more and 100 μm or less, in the second region of 0.2 μm or more and less than 1.0 μm, and in the third region of 0.050 μm or more and less than 0.2 μm. The total volume of the pores in the second region is 10% or more and 40% or less of the total volume of the pores in the first region, and the total volume of the pores in the third region is 40% or more and 80% or less of the total volume of the pores in the second region. Furthermore, in the gas diffusion electrode of the first aspect of the present invention, it is preferred that the total volume of the pores in the first region is 1.2 mL/g or more and 2.0 mL/g or less, the total volume of the pores in the second region is 0.2 mL/g or more and 0.4 mL/g or less, and the total volume of the pores in the third region is 0.15 mL/g or more and 0.30 mL/g or less. The first aspect of the present invention is explained below.

The first microporous layer 201 of the present invention is formed on the electrical conducting porous substrate by coating a first ink directly thereon. For a better gas diffusivity and water removal performance, the porosity and the pore size of the first microporous layer is preferably controlled.

The pore size of the first microporous layer of the present invention can be defined by a peak value in the distribution by Mercury porosimeter. In order to achieve the gas diffusivity at a high level, it is preferred that the first microporous layer has a peak in the region of 0.2 μm or more in the pore size distribution because in this region, the gas diffusivity can be promoted. As for the improvement of the fuel cell performance of the fuel cell at a high temperature, when the pore size is too large, the water vapor produced inside the fuel cell cannot be retained, which is likely to cause the dry-out of the electrolyte membrane. In addition, when the pore size is too large, the ink coated on the first microporous layer can fall into pores, and thus the surface smoothness of the microporous layer can be deteriorated. Therefore, in the present invention, the first microporous layer preferably has a peak in the region of less than 1.0 μm in the pore size distribution. In other words, the first microporous layer has preferably a peak in the second region in the pore size distribution.

For the thickness of the first microporous layer of the present invention, as described above, it is preferred that the total thickness of the microporous layer is larger than 10 μm in order to exhibit the makeover effect of the roughness of the electrical conducting porous substrate. It is more preferred that the thickness of the first microporous layer alone is 10 μm or more. However, because it is necessary to assure the gas diffusivity even when a second microporous layer with a smaller pore size, which will be explained later, is laminated thereon, the thickness of the first microporous layer is preferably less than 50 μm.

Because the microporous layer is formed by coating an ink on the surface of the electrical conducting porous substrate, the ink can infiltrate into an empty pore of the electrical conducting porous substrate, causing the formation of an infiltration portion 203 of the microporous layer in the electrical conducting porous substrate. In the present invention, the thickness of each microporous layer is evaluated as the thickness of the portion present outside the electrical conducting porous substrate, excluding this infiltration portion.

The second microporous layer 202 of the present invention is formed by coating a second ink on the outer side of the first microporous layer, when viewed from the electrical conducting porous substrate side. When the microporous layer consists of two layers alone of the first microporous layer and the second microporous layer, the second ink is coated on the surface of the first microporous layer. The second microporous layer is brought in contact with a catalyst layer when incorporated in a fuel cell, and thus has a role to suppress the permeation of the water (water vapor) generated in the catalyst layer in the cathode, and in the anode, to suppress the permeation of water by back-diffusion from the cathode side to the anode side, thereby preventing the drying (dry-out) of the electrolyte membrane. For this reason, it is preferred that the second microporous layer of the present invention is, in the pore size distribution, smaller than the first microporous layer. The second microporous layer has preferably a peak in the region of 0.050 µm or more and less than 0.2 µm, more preferably in the region of 0.050 µm or more and 0.09 µm or less, and particularly preferably in the region of 0.050 µm or more and 0.08 µm or less. In other words, the second microporous layer has preferably a peak in the third region in the pore size distribution.

The second microporous layer of the present invention preferably has a thickness of 0.1 µm or more and less than 10 µm. When the second microporous layer has a thickness in this preferred range, the suppression effect of the permeation of water vapor is obtained while the gas diffusivity does not decrease. More preferably, the second microporous layer has a thickness of 0.1 µm or more and 7 µm or less, and further preferably of 0.1 µm or more and 5 µm or less.

The pore size of the first microporous layer can be controlled by selecting a type of the electrical conducting fine particles blended in the first ink, adjusting the dispersion degree, and selecting appropriate particle size and shape of the electrical conducting fine particles. As electrical conducting fine particles, carbon black is preferably used since it is easily accessible at a low price and highly trusted for the safety. In order to provide the gas diffusion electrode of the present invention which has, in the pore size distribution, a peak at least in the second region (0.2 µm or more and less than 1 µm), it is preferred that the carbon black particles used in the first microporous layer form an agglomerate (namely a structure), and the carbon black forms a two- or three-dimensional beads-on-string structure. For this purpose, in the second aspect of the present invention, the carbon black in the first microporous layer has a structure index of 3.0 or more.

In other words, in the first aspect of the present invention, it is preferred that the first microporous layer contains carbon black with a structure index of 3.0 or more. In the second aspect of the present invention, it is essential that the first microporous layer contains carbon black with a structure index of 3.0 or more.

The structure index herein is a value obtained by dividing the value of the DBP oil absorption (cc/100 g) of the carbon black by the value of the BET specific surface area (m$^2$/g). A larger value of the structure index indicates that the branching structure of the carbon black aggregate is widespread, and a large pore is easily formed inside the coated membrane. In the second aspect of the present invention, the carbon black in the first microporous layer has preferably an upper limit of the structure index of about 4.5. In this preferred range, a crack between the carbon black agglomerates is less likely to occur.

In the second microporous layer, a fine coated membrane with a low porosity can be formed by, for example, adjusting the dispersion degree of the electrical conducting fine particles blended in the second ink at a high level, or using electrical conducting fine particles with a small particle size. When carbon black is used as electrical conducting fine particles, since the particles of the primary particle size cannot be dispersed, the pore size becomes small depending on how finely the particles of the secondary particle size (the diameter when the particles aggregate to some extent) can be dispersed. Furthermore, in order for the gas diffusion electrode of the present invention to have a peak in the third region (0.050 µm or more and less than 0.2 µm) of the pore size distribution, in the second aspect of the present invention, the carbon black having a structure index of less than 3.0 is used as the carbon black contained in the second microporous layer. In the carbon black of the second microporous layer in the second aspect of the present invention, a preferred structure index is 2.7 or less. On the other hand, the structure index has preferably a lower limit of 1.5 or more. Within this preferred range, there is a low possibility that the electrical conductivity of the carbon black decreases or the viscosity decreases when converted to a paint.

In other words, in the first aspect of the present invention, it is preferred that the second microporous layer contains carbon black with a structure index of less than 3.0. In the second aspect of the present invention, it is essential that the second microporous layer contains carbon black with a structure index of less than 3.0.

In the gas diffusion electrode of the present invention, it is preferred that the peak of the first region comes from the electrical conducting porous substrate, the peak of the second region comes from the first microporous layer and, the peak of the third region comes from the second microporous layer. Since the pores in the first region plays mainly a role in the gas diffusivity of the gas diffusion electrode of the present invention, the total volume of the pores in the first region is preferably 1.2 mL/g or more and 2.0 mL/g or less.

The pores corresponding to the peak in the second region are preferably present mainly in the first microporous layer since they modify the roughness of the electrical conducting porous substrate (makeover effect) and prevent the transfer of the roughness to the catalyst layer. The total volume of the pores in the second region is preferably 0.2 mL/g or more and 0.4 mL/g or less.

The pores corresponding to the peak in the third region has a main role in the diffusion suppression of the water vapor. Therefore, fine pores are preferably present in surface layer on the catalyst side of the gas diffusion electrode. The total volume of the pores in the third region is preferably 0.15 mL/g or more and 0.30 mL/g or less. Within in this preferred range, it is unlikely that the diffusivity of the gas and the water removal performance of the condensed water decrease.

The gas diffusion electrode of the present invention has a good fuel cell performance at a high temperature. In order to improve the fuel cell performance at a low temperature of 40° C. or less as well, the gas diffusivity in the thickness direction is preferably 30% or more, and more preferably 32% or more. A higher gas diffusivity in the thickness direction is better, but the upper limit is preferably about 40%. Within this preferred range, when incorporated in a fuel cell, the structure can be maintained even if the pore volume is large and pressure is applied inside the cell.

In order to improve further the fuel cell performance at a low temperature of 40° C. or less, the gas diffusivity in the in-plane direction of the gas diffusion electrode of the present invention is preferably 25 cc/min or more, and more preferably 50 cc/min or more. The gas diffusivity in the in-plane direction is, as described later, measured in the measurement condition of the pressure difference by 5 kPa, using the gas diffusion electrode. However, as a measurement limit, the measurement cannot be carried out over 190 cc/min. As an actual upper limit, about 190 cc/min at 3 kPa is preferred. Within this preferred range, the gas diffusivity in the thickness direction does not decrease because of too large a thickness of the gas diffusion electrode, or the structure as the gas diffusion layer is easily maintained.

The first microporous layer or the second microporous layer can be formed in two stages or more when a gradient in the porosity of each layer is formed, or when the first microporous layer cannot be formed thickly at one time. When the microporous layer is formed by laminating three or more individual microporous layers, other microporous layer(s) is/are placed between the first microporous layer and the second microporous layer, and the pore size and the porosity of the layer(s) preferably take(s) a value equivalent to that of the first microporous layer or the second microporous layer or an intermediate value between the first microporous layer and the second microporous layer.

In the present invention, it is preferred that the first ink is coated on the surface of the electrical conducting porous substrate to form the first microporous layer, and then the second ink is coated thereon so that the thickness of the second microporous layer is less than 10 μm. In order to coat evenly a thin film like this, it is effective to apply the wet-on-wet multi-layering technique in which the first ink is coated on the electrical conducting porous substrate, and then the second ink is uninterruptedly coated without drying the first ink. The electrical conducting porous substrate has generally a rough surface and the height difference of the irregularities can be close to 10 μm in some cases. The coating of the first ink on a surface with huge irregularities like this cannot completely eliminate the irregularities after drying. Because a thin film of less than 10 μm is suitable for the second microporous layer, the second ink viscosity is preferably low to some extent. When such an ink of the low viscosity is coated on the above-described surface having irregularities to form a thin film, the ink is likely to accumulate in the concave part of the irregularities (in other words, to become a thick film) while the ink does not stay on the protruding part. In an extreme case, a thin film of the second microporous layer cannot be formed. In order to prevent this, before drying, the first ink and the second ink are laminated, and then they are dried together. In this way, a thin film of the second microporous layer can be formed evenly on the surface of the first microporous layer.

In a case of the multilayer coating, drying the layers at one time after the completion of the multilayer coating instead of drying each layer after the coating requires only one drying furnace and shortens the coating process, thereby saving the equipment cost and production space. Furthermore, because the process is shortened, the loss of the generally expensive electrical conducting porous substrate can be reduced, too.

In the above multilayer coating, following methods can be applied: a method in which the first ink coating is carried out by a die coater, and the second ink coating is also carried out by the die coater, a method in which the first ink coating is carried out by one of various roll coaters, and then the second ink coating is carried out by a die coater, a method in which the first ink coating is carried out by a knife-over-roll coater, and then the second ink coating is carried out by a die coater, a method in which the first ink coating is carried out by a lip coater, and then the second ink coating is carried out by a die coater, a method in which a slide die coater is used to laminate the first ink and the second ink before coating on the substrate. Particularly, in order to coat a highly viscous ink evenly, the first ink coating is preferably carried out by a die coater or a knife-over-roll coater.

The coating methods by a die coater or a knife-over-roll coater as described above are described in many existing literatures, e.g., "All about Converting Technologies" (Ed., Converting Technical Institute). In the die coater, an ink measured in advance is coated on a substrate via a die for distributing the ink evenly in the width direction. In the knife-over-roll, like in a knife coater, a roll knife installed at a certain height scrapes off an ink which has been coated thickly beforehand to form an even coated surface regardless of the irregularities of the substrate.

A suitable aspect of the present invention is firstly to form a thin film of 0.1 μm or more and less than 10 μm as evenly as possible as a surface layer such as the second microporous layer. It is also desirable to make the bonding between the electrolyte membrane with the catalysts coated on its both surfaces and the gas diffusion electrode (the area of the contact between the catalyst layer surface and the microporous layer surface of the gas diffusion electrode) as strong as possible. For this purpose, it is desirable to make the surface of the microporous layer of the gas diffusion electrode as smooth as possible. A method in which a catalyst ink is coated on the gas diffusion electrode side is also generally known (GDE method), but in this case as well, the surface of the microporous layer of the gas diffusion electrode is desirably as smooth as possible for even coating of the catalyst ink. Thus, when the smoothness is required, the first ink is coated by a knife-over-roll, for example, to level the rough substrate, and then the second ink is coated by a die coater. In this way, a better smoothness can be obtained.

As the index of the smoothness, the surface roughness Ra is used. In the gas diffusion electrode of the present invention, the second microporous layer is located at the outermost surface. The surface roughness Ra of the second microporous layer has desirably a value of 6 μm or less, and more preferably a value of 4 μm or less. The Ra of more than 6 μm causes a poor bonding with the catalyst layer. Considering, e.g., the case of coating the catalyst ink on the surface of the microporous layer, the lower limit of the surface roughness Ra is considered to be about 0.1 μm. When a carbon paper is used as the electrical conducting porous substrate, since the substrate roughness is generally as large as 10 μm or more, it is difficult to make the surface roughness Ra of the second microporous layer located at the outermost surface as small as 2 μm or less even when the first and the second microporous layers are provided thereon.

Various surface roughness measuring instruments can be applied for measuring the surface roughness, but a non-contact measuring instrument is preferably used since the microporous layer is relatively fragile. An example of the non-contact measuring instrument is the laser microscope VX-100 produced by KEYENCE CORPORATION.

A suitable production apparatus for producing the gas diffusion electrode of the present invention is composed of an unwinder for unwinding a continuous electrical conducting porous substrate which has been wound in a roll shape, a first coater for coating a first ink on the electrical conducting porous substrate unwounded by the unwinder, a second coater which is placed on the same side of the substrate as the first coater and which coats a second ink on the electrical conducting porous substrate which has the first ink coated thereon and has not been essentially dried, a drying furnace for drying the electrical conducting porous substrate with the first ink and the second ink coated thereon, and a winder for winding the resulting gas diffusion electrode.

FIGS. 2 and 3 illustrate a particularly preferable production apparatus in the present invention.

In the production apparatus shown in FIG. 2, a continuous electrical conducting porous substrate 1 is unwound by the unwinder 2, and transported with an appropriate support of the guide roll 3. Then a first ink is coated on one surface of the electrical conducting porous substrate by the first coater, or the first die coater 4. The first ink is usually fed by the ink tank 12 via the liquid feeding pump 13 to the die coater. The first ink is preferably filtered by the filter 14. The second ink is coated on the first ink-coated surface by the second coater, or second die coater 5 which is installed on the same side of the substrate as the first die coater 4, and then the drying is carried out in the drying furnace 7. The gas diffusion electrode is wound by the winder 9. The second ink is also usually fed by the ink tank 12 via the liquid feeding pump 13 to the die coater. The second ink is preferably filtered by the filter 14. As shown in FIG. 2, it is preferred that the sintering machine 8 is installed after the drying furnace 7 to carry out the sintering in-line. When the ink is coated by the die coater, the back roll 6 may be used. For winding, the interleave paper 10 which is unwound by the unwinder 11 may be wounded together with the product for the coated surface protection.

In the production apparatus shown in FIG. 3, the knife-over-roll 40 is installed instead of the first die coater 4 shown in FIG. 2. When the ink is coated by a knife-over-roll, the substrate is transported while a coating material is fed to the liquid dam 42, and the roll knife roll 41 scraps off the coating material to achieve a desired coating amount.

As shown in FIG. 2 or 3, when several layers are placed on the substrate, drying the several layers at one time allows for the simplification of the drying furnace, and also shortens the process from unwinding to winding, thereby achieving high productivity and a small loss if the substrate breaks.

In the gas diffusion electrode of the present invention, on the both surfaces of the electrolyte membrane with a catalyst layer placed on each side, the gas diffusion electrode is bonded by compression to be in contact with the catalyst layer, and a member such as a bipolar plate is incorporated to form a single cell, which is used as a fuel cell. In this case, it is effective that the second microporous layer is in contact with the catalyst layer.

EXAMPLES

Below, the present invention will be concretely described by way of examples. The materials, the methods for producing an electrical conducting porous substrate, and the battery performance evaluation method of fuel cell that are used in the examples are described below.

<Materials>
Electrical Conducting Porous Substrate

A carbon paper with a thickness of 150 μm and a porosity of 85% was prepared as follows.

A polyacrylonitrile carbon fiber, "TORAYCA" (registered trademark) T300 produced by Toray Industries, Inc. (average monofilament diameter: 7 μm) was cut into the length of 12 mm. After the paper making process of continuous fabrication with water as the paper making medium, dipping in a polyvinyl alcohol aqueous solution of 10% by mass and drying, the resultant was wounded in a roll shape to obtain a continuous carbon fiber paper which was a carbon short fiber with areal weight of 15 g/m$^2$. Based on 100 parts by mass of the carbon fiber paper, the amount of the polyvinyl alcohol added corresponds to 20 parts by mass.

A flake graphite (average particle size: 5 μm), a phenol resin and methanol were mixed in a mass ratio of 5:10:85 to prepare a dispersion liquid. The above carbon fiber paper was continuously dipped in the above dispersion liquid in a way that the resin component (phenol resin+flake graphite) would be 130 parts by mass based on 100 parts by mass of the carbon short fiber. After the resin impregnation process of drying at the temperature of 100° C. for 5 minutes, the carbon fiber paper was wound in a roll shape to obtain a resin-impregnated carbon fiber paper. As the phenol resin, a mixture of a resol type phenolic resin and a novolak type phenolic resin in the mass ratio of 1:1 was used.

Hot platens were installed in parallel in a pressing machine with flat plate, and a spacer was arranged on the below hot platen. The annealing was carried out at a hot platen temperature of 180° C. for 5 minutes.

The carbon fiber paper subjected to the compression treatment was, as a precursor fiber sheet, introduced into a heating furnace with a highest temperature of 2400° C. and kept under the nitrogen gas, and after the carbonization process of baking, the carbon fiber paper was wound in a roll shape to obtain a carbon paper. The resulting carbon paper had a density of 0.25 g/cm$^3$ and a porosity of 85%.

A carbon paper with the thickness of 180 μm and the porosity of 85% was obtained in the same way as the carbon paper with the thickness of 150 μm and the porosity of 85% except that the areal weight of the carbon fiber and the spacer thickness during the compression treatment were adjusted so that the thickness would be 180 μm after the carbonization.

In addition, for comparison, a carbon paper which had a thickness of 250 μm after the carbonization was obtained by adjusting the carbon fiber areal weight and the spacer thickness in the compression treatment.

The carbon black $CB_1$ with the structure index of 3.0 or more
The DBP oil absorption 140 cc/100 g, BET specific surface area 41 m$^2$/g, the structure index 3.4
The carbon black $CB_2$ with the structure index 3.0 or more
The DBP oil absorption 125 cc/100 g, the BET specific surface area 41 m$^2$/g, the structure index 3.1
The carbon black $CB_3$ with the structure index of less than 3.0
The DBP oil absorption 175 cc/100 g, the BET specific surface area 67 m$^2$/g, the structure index 2.6
The carbon black $CB_4$ with the structure index of less than 1.5
The DBP oil absorption 174 cc/100 g; the BET specific surface area 254 m$^2$/g, the structure index 0.69
Hydrophobic Polymer
"Neoflon" (registered trademark) FEP dispersion ND-110 (FEP resin, manufactured by Daikin Industries, Ltd.)
Surfactant
"TRITON" (registered trademark) X-100 (manufactured by Nacalai Tesque, Inc.)

<Measurement of Thickness of Substrate and Microporous Layer>

The thickness of the substrate (the gas diffusion electrode and the electrical conducting porous substrate) was measured, using a digital thickness meter, "Digimicro" produced by Nikon Corporation, by adding a load of 0.15 MPa to the substrate.

For the thickness of the microporous layer, when the ink was coated on the substrate, the thickness of the electrical conducting porous substrate was subtracted from the thickness of the gas diffusion electrode to check the coating thickness. In other words, the thickness of the first microporous layer was considered as the difference between the thickness of the substrate on which only the first microporous layer was coated and the thickness of the electrical conducting porous substrate. In this case, the thickness of the microporous layer dipped in the electrical conducting porous substrate was not included. Furthermore, the thickness of the second microporous layer was, as shown in FIG. 1 in which the second microporous layer is formed on the electrical conducting porous substrate with the first microporous layer formed thereon, adjusted by the difference between the portion where the second microporous layer was formed and the portion where the second microporous layer was not formed.

The thickness of the microporous layer in the gas diffusion electrode obtained by coating and sintering an ink, the S-4800 produced by Hitachi, Ltd. was used as a scanning electron microscopy. From the through-plane cross section of the gas diffusion electrode, in each region of the electrical conducting porous substrate, the first microporous layer, and the second microporous layer, the distance between the interface of the electrical conducting porous substrate and the first microporous layer and the interface of the second microporous layer and the first microporous layer was considered as the thickness of the first microporous layer, and the average value in the view of 10 was obtained.

Furthermore, the distance between the interface of the first microporous layer and the second microporous layer, and the second microporous layer surface was considered as the thickness of the second microporous layer, and thus the average value in the view of 10 was obtained.

For preparation of the cross section of the gas diffusion electrode, an ion milling apparatus IM4000 produced by Hitachi High-Tech Solutions Corporation was used. The image magnification of the scanning electron microscopy in the measurement was 1000× or 2000× for the first microporous layer, and 2000× or 3000× for the second microporous layer.

<Measurement of Pore Size>

For the pore size of the electrical conducting porous substrate and the microporous layer, a peak size of the pore size distribution was obtained by measuring pore sizes in the range at a measurement pressure of 6 kPa to 414 MPa (pore size of 30 nm to 400 μm) by mercury intrusion technique. When a plurality of peaks appears in a close pore size region, the peak size at the highest peak was used. The AutoPore 9520 (produced by SHIMADZU CORPORATION) was used for measurement.

For the peak of the pore size, on the curve of the log differentiation of the pore volume distribution graph (FIG. 5) obtained in the measurement by the Mercury porosimeter, the local maximal point in the region concerned (in the case of several maximal points, the highest maximal point) was considered as the peak in the region, and its position was used as the pore size.

On the above curve of the log differentiation of the pore volume distribution graph (FIG. 5), even when there was not a maximal point in the region concerned, if there was a shoulder part protruding upwards in the region as shown in FIG. 6 for example, the region was considered to have a peak. By "there is a shoulder part protruding upwards in the region," the pore size distribution in the region has a curve that protrudes upwards.

The total pore volume is obtained by subtracting the integration data of the small pore size from the integrated volume value of the large pore size of measurement target in the integration data in which the log differentiation of the pore volume distribution graph is integrated with respect to the pore size. For example, the total pore volume in the second region (the region of 0.2 μm or more and less than 1.0 μm) is obtained by subtracting the integration data until 1.0 μm from the integration data until 0.2 μm.

<Measurement of Surface Roughness>

The laser microscope VK-X100 produced by KEYENCE CORPORATION was used with the objective lens of 10× and without cut-off to measure the gas diffusion electrode of interest for its microporous layer surface roughness, and thus an arithmetic average roughness Ra was obtained. This process was carried out in the view of 10, and its average value was used as the surface roughness.

<Gas Diffusivity in Thickness Direction>

The moisture vapor diffusion permeameter (MVDP-200C) produced by Seika Corporation is used to flow the gas that needs measuring for the diffusivity to one side (primary side) of the gas diffusion electrode and flow nitrogen gas to the other side (secondary side). The pressure difference between the primary side and the secondary side was about 0 Pa (0±3 Pa) (in other words, the gas flow due to the pressure difference rarely occurs, and the gas movement phenomenon is only due to the molecule diffusion), and the gas concentration at the equilibrium was measured by the gas concentration meter on the secondary side. This value (%) was used as an index of the gas diffusivity in the thickness direction.

<Gas Diffusivity in in-Plane Direction>

The moisture vapor diffusion permeameter (MVDP-200C) produced by Seika Corporation is used. In a pipe arrangement as shown in FIG. 4, only the valve A (303) is opened first while the valve B (305) is closed. Nitrogen gas 313 is flowed to the pipe arrangement primary side A (302), and adjusted so that a given amount of gas (190 cc/min) is flowed into the mass flow controller (301), which puts a gas pressure of 5 kPa with respect to the atmospheric pressure on the pressure controller (304). The gas diffusion electrode sample (308) is placed on the sealing member (312) between the gas chamber A (307) and the gas chamber B (309). Then, the valve A (303) is closed and the valve B (305) is opened, causing the nitrogen gas to flow to the pipe arrangement B (306). The nitrogen gas flowing to the gas chamber A (307) moves to the gas chamber B (309) through the pores of the gas diffusion electrode sample (308), then passes the pipe arrangement C (310) and further the gas flow meter (311) and then liberated to the air. The gas flow rate (cc/min) that passes the gas flow meter (311) was measured and this value was used as the gas diffusivity in the in-plane direction.

<Evaluation of Fuel Cell Performance>

The resulting gas diffusion electrode was placed on the both sides of an integrated product of the electrolyte membrane and the catalyst layer (the electrolyte membrane "GORE-SELECT" (registered trademark) produced by Japan Gore Ltd., which has a catalyst layer "PRIMEA" (registered trademark) produced by Japan Gore Ltd. formed on both surfaces) in a way that the catalyst layer and the microporous layer would be in contact, and hot-pressed to produce a membrane electrode assembly (MEA). This membrane electrode assembly was incorporated into a unit cell for a fuel cell and then electricity was generated at the cell temperature of 40° C., the fuel utilization efficiency of 70%, and the air utilization efficiency of 40% under the humidification so that hydrogen on the anode side and the air on the cathode side would have a dew point of 75° C. and 60° C. respectively. As the current density was increased, and the current density value when the electricity generation stopped (current density limit) was used as an index of the anti-flooding characteristic. A similar measurement was carried out at the cell temperature of 90° C., and the value was used as an index of the anti-dry-out characteristic. The fuel cell performance under the ordinary operation conditions (the cell temperature of 70° C.) was also measured.

Example 1

A carbon paper which was wound in a roll shape and had the thickness of 150 μm and the porosity of 85% was transported using a winding type transportation apparatus. During the transportation, the carbon paper was dipped in a dipping tank filled with a hydrophobic polymer dispersion in which a fluororesin was dispersed in water at the fluororesin concentration of 2% by mass and thus subjected to a hydrophobic treatment. Then the carbon paper was dried in the drying furnace 7 set at 100° C. and wound by a winder. Thus, an electrical conducting porous substrate subjected to a hydrophobic treatment was obtained. As the hydrophobic polymer dispersion, a FEP dispersion ND-110 in which FEP was diluted with water to the concentration of 2% by mass was used.

Then, as shown in the scheme of FIG. 2, a winding type continuous coater was prepared by providing the transportation apparatus equipped with the unwinder 2, the guide roll 3, the back roll 6, the interleave paper unwinder 11, and the winder 9 with two die coaters (4, 5), the drying furnace 7 and the sintering machine 8.

As the above electrical conducting porous substrate subjected to a hydrophobic treatment, the original fabric wound in a 400-meter roll of the carbon paper with the thickness of 150 μm, the porosity of 85%, and the widths of about 400 mm was set in the unwinder 2.

The original fabric was transported by the driving rolls installed in the unwinder part, the winder part, and the coater part. First, the first die coater 4 was used to coat the first ink, then directly the second ink was coated by the second die coater 5, followed by drying of the water by hot air of 100° C. in the drying furnace 7, sintering in the sintering machine 8 with the temperature set at 350° C. and then winding by the winder 9.

The ink was prepared as follows.
The First Ink:
15 parts by mass of the carbon black CBI with the structure index 3.0 or more, 5 parts by mass of an FEP dispersion ("Neoflon" (registered trademark) ND-110), 15 parts by mass of a surfactant ("TRITON" (registered trademark) X-100), and 65 parts by mass of purified water were mixed in a planetary mixer to prepare the ink. The ink viscosity was 7.5 Pa·s.
The Second Ink:
5 parts by mass of the carbon black $CB_3$ with the structure index less than 3.0, 2 parts by mass of an FEP dispersion ("Neoflon" (registered trademark) ND-110), 7 parts by mass of a surfactant ("TRITON" (registered trademark) X-100), and 86 parts by mass of purified water were mixed in a planetary mixer to prepare the ink. The conditions were adjusted so that the areal weight of the microporous layer after sintering would be 16 g/m² in the case of the first ink coating. The thickness of the first microporous layer was 25 μm. In the case of second ink coating, the thickness of the second microporous layer was adjusted to be 3 μm.

The results of the measurement of the pore size distribution of the gas diffusion electrode are shown in Table 1.

The gas diffusion electrode prepared as above was bonded by thermal compression on the both sides of the electrolyte membrane with a catalyst layer formed on both surfaces in a way that the microporous layer and the catalyst layer would be in contact, and then incorporated into the unit cell of the fuel cell. The fuel cell performance (current density limit) at each temperature of 40° C. and 70° C. and 90° C. was evaluated.

The values are shown in Table 1 and Table 2, including other property values.

Example 2

A gas diffusion electrode was obtained in the same way as in Example 1 except that the carbon black contained in the first ink in Example 1 was changed to the carbon black $CB_2$ having a structure index of 3.0 or more.

Example 3

A gas diffusion electrode was obtained in the same way as in Example 1 except that the thickness of the carbon paper in Example 1 was changed to 180 μm.

Example 4

A gas diffusion electrode was obtained in the same way as in Example 3 except that the carbon black contained in the first ink in Example 3 was changed to the carbon black $CB_2$ having a structure index of 3.0 or more.

Example 5

A gas diffusion electrode was obtained in the same way as in Example 1 except a carbon paper having a porosity of 85% and a thickness of 250 μm was used as the electrical conducting porous substrate. This gas diffusion electrode was incorporated into the unit cell for a fuel cell as in Example 1, and then the fuel cell performance was evaluated.

Example 6

A gas diffusion electrode was obtained in the same way as in Example 5 except that the carbon black contained in the first ink in Example 5 was changed to the carbon black $CB_2$ having a structure index of 3.0 or more.

Comparative Example 1

A gas diffusion electrode was obtained in the same way as in Example 1 except the carbon black of the first microporous layer in Example 1 was changed to the carbon black $CB_3$ having a structure index of less than 3.0, the carbon black of the second microporous layer was changed to the carbon black $CB_4$ having a structure index of less than 1.5. This gas diffusion electrode was incorporated into the unit-cell for a fuel cell as in Example 1, and then the fuel cell performance was evaluated. In this example, a peak was not obtained in the second region of the pore size distribution, and thus the total pore volume in this region had a small value.

Comparative Example 2

A gas diffusion electrode was obtained in the same way as in Example 1 except that the carbon black of the first microporous layer in Example 1 was changed to the carbon black $CB_4$ having a structure index of less than 1.5.

In this example, a peak was not obtained in the second region of the pore size distribution, and thus the total pore volume in this region had a small value.

Comparative Example 3

A gas diffusion electrode was obtained in the same way as in Example 1 except that the carbon black in the first microporous layer in Example 1 was changed to the carbon black $CB_3$ having a structure index of less than 3.0.

In this example, a peak was not obtained in the second region of the pore size distribution, and thus the total pore volume in this region had a small value.

Comparative Example 4

A gas diffusion electrode was obtained in the same way as in Example 3 except that the carbon black in the first microporous layer in Example 3 was changed to the carbon black $CB_3$ having a structure index of less than 3.0.

Example 7

A gas diffusion electrode was obtained in the same way as in Example 1 except that the thickness of the first microporous layer in Example 1 was changed to 22 µm, and the thickness of the second microporous layer to 6 µm.

Example 8

A gas diffusion electrode was obtained in the same way as in Example 7 except that the carbon black contained in the first ink in Example 7 was changed to the carbon black $CB_2$ having a structure index of 3.0 or more.

Example 9

A gas diffusion electrode was obtained in the same way as in Example 1 except that the thickness of the second microporous layer in Example 1 was changed to 11 µm.

Example 10

A gas diffusion electrode was obtained in the same way as in Example 9 except that the carbon black contained in the first ink in Example 9 was changed to the carbon black $CB_2$ having a structure index of 3.0 or more.

Example 11

A gas diffusion electrode was obtained in the same way as in Example 1 except that the thickness of the first microporous layer in Example 1 was changed to 50 µm.

Example 12

A gas diffusion electrode was obtained in the same way as in Example 11 except that the carbon black contained in the first ink in Example 11 was changed to the carbon black $CB_2$ having a structure index of 3.0 or more.

Example 13

A gas diffusion electrode was obtained in the same way as in Example 1 except that the first ink was diluted with water to facilitate the infiltration into the electrical conducting porous substrate, and the thickness of the microporous layer almost matched with that in Example 1.

Example 14

A gas diffusion electrode was obtained in the same way as in Example 13 except that the carbon black contained in the first ink in Example 13 was changed to the carbon black $CB_2$ having a structure index of 3.0 or more.

TABLE 1

| | | Unit | Example 1 | Example 2 | Example 3 | Example 4 | Example 5 | Example 6 | Example 7 | Example 8 | Example 9 |
|---|---|---|---|---|---|---|---|---|---|---|---|
| Conductive Porous Substrate | Thickness | µm | 150 | 150 | 180 | 180 | 250 | 250 | 150 | 150 | 150 |
| | Porosity | % | 85 | 85 | 85 | 85 | 85 | 85 | 85 | 85 | 85 |
| | Peak in Pore Size Distribution | µm | 34 | 34 | 37 | 37 | 40 | 40 | 34 | 34 | 34 |
| | Water-Repellent Resin | | FEP | FEP | FEP | FEP | FEP | FEP | FEP | FEP | FEP |
| First Microporous Layer | Thickness | µm | 25 | 25 | 25 | 25 | 25 | 25 | 22 | 22 | 22 |
| | Areal Weight | g/m² | 16 | 16 | 16 | 16 | 16 | 16 | 14 | 14 | 14 |
| | Peak in Pore Size Distribution | µm | 0.29 | 0.31 | 0.41 | 0.42 | 0.38 | 0.39 | 0.28 | 0.29 | 0.25 |
| | Structure Index of Carbon Black | | 3.4 | 3.1 | 3.4 | 3.1 | 3.4 | 3.1 | 3.4 | 3.1 | 3.4 |
| | Type of Water-Repellent Resin | | FEP | FEP | FEP | FEP | FEP | FEP | FEP | FEP | FEP |
| Second Microporous Layer | Thickness | µm | 3 | 3 | 3 | 3 | 3 | 3 | 6 | 6 | 11 |
| | Peak in Pore Size Distribution | µm | 0.095 | 0.095 | 0.12 | 0.12 | 0.1 | 0.1 | 0.12 | 0.12 | 0.12 |
| | Structure Index of Carbon Black | | 2.6 | 2.6 | 2.6 | 2.6 | 2.6 | 2.6 | 2.6 | 2.6 | 2.6 |
| | Type of Water-Repellent Resin | | FEP | FEP | FEP | FEP | FEP | FEP | FEP | FEP | FEP |
| Total Volume of the Pores | Ratio (the Second Region/the First Region) | % | 18.9 | 19.1 | 16.4 | 16.4 | 9.3 | 9.4 | 17.4 | 17.8 | 16.6 |
| | Ratio (the Third Region/the Second Region) | % | 64 | 64 | 60 | 60 | 64 | 63 | 78 | 77 | 88 |
| | Total Volume (the First Region) | mL/g | 1.53 | 1.52 | 1.81 | 1.79 | 2.78 | 2.76 | 1.48 | 1.46 | 1.52 |
| | Total Volume (the Second Region) | mL/g | 0.289 | 0.290 | 0.296 | 0.293 | 0.258 | 0.259 | 0.258 | 0.260 | 0.252 |
| | Total Volume (the Third Region) | mL/g | 0.186 | 0.185 | 0.178 | 0.176 | 0.165 | 0.164 | 0.201 | 0.199 | 0.221 |

TABLE 1-continued

|  |  | Unit | Example 1 | Example 2 | Example 3 | Example 4 | Example 5 | Example 6 | Example 7 | Example 8 | Example 9 |
|---|---|---|---|---|---|---|---|---|---|---|---|
| Gas Diffusion Electrode | Total Thickness of Microporous Layer | μm | 28 | 28 | 28 | 28 | 28 | 28 | 28 | 28 | 33 |
|  | Gas Difusivity in the Thickness Direction | % | 32 | 32 | 29 | 29 | 29 | 29 | 31 | 31 | 29 |
|  | Gas Difusivity in the In-plane Direction | cc/min | 102 | 100 | 115 | 113 | 141 | 136 | 94 | 92 | 89 |
|  | Surface Roughness of Microporous Layer | μm | 3.9 | 3.8 | 4.3 | 4.4 | 5.6 | 5.7 | 4.2 | 4.3 | 4.3 |
|  | Power Generation Performance (@40° C.) | A/cm$^2$ | 1.74 | 1.72 | 1.51 | 1.47 | 1.55 | 1.53 | 1.61 | 1.58 | 1.38 |
|  | Power Generation Performance (@70° C.) | A/cm$^2$ | 2.48 | 2.45 | 2.39 | 2.36 | 2.34 | 2.31 | 2.35 | 2.30 | 2.36 |
|  | Power Generation Performance (@90° C.) | A/cm$^2$ | 1.67 | 1.62 | 1.65 | 1.60 | 1.55 | 1.53 | 1.72 | 1.69 | 1.76 |

TABLE 2

|  |  | Unit | Example 10 | Example 11 | Example 12 | Example 13 | Example 14 | Comparative Example 1 | Comparative Example 2 | Comparative Example 3 | Comparative Example 4 |
|---|---|---|---|---|---|---|---|---|---|---|---|
| Conductive Porous Substrate | Thickness | μm | 150 | 150 | 150 | 150 | 150 | 150 | 150 | 150 | 250 |
|  | Porosity | % | 85 | 85 | 85 | 85 | 85 | 85 | 85 | 85 | 85 |
|  | Peak in Pore Size Distribution | μm | 34 | 34 | 34 | 40 | 40 | 34 | 34 | 40 | 40 |
|  | Water-Repellent Resin |  | FEP | FEP | FEP | FEP | FEP | FEP | FEP | FEP | FEP |
| First Microporous Layer | Thickness | μm | 22 | 50 | 50 | 25 | 25 | 25 | 25 | 25 | 25 |
|  | Areal Weight | g/m$^2$ | 14 | 28 | 28 | 20 | 20 | 16 | 20 | 16 | 16 |
|  | Peak in Pore Size Distribution | μm | 0.26 | 0.25 | 0.26 | 0.37 | 0.39 | — | 0.08 | 0.08 | 0.08 |
|  | Structure Index of Carbon Black |  | 3.1 | 3.4 | 3.1 | 3.4 | 3.1 | 2.6 | 0.69 | 2.6 | 2.6 |
|  | Type of Water-Repellent Resin |  | FEP | FEP | FEP | FEP | FEP | FEP | FEP | FEP | FEP |
| Second Microporous Layer | Thickness | μm | 11 | 3 | 3 | 3 | 3 | 3 | 3 | 3 | 3 |
|  | Peak in Pore Size Distribution | μm | 0.12 | 0.06 | 0.06 | 0.06 | 0.06 | 0.08 | 0.11 | 0.08 | 0.08 |
|  | Structure Index of Carbon Black |  | 2.6 | 2.6 | 2.6 | 2.6 | 2.6 | 0.69 | 2.6 | 2.6 | 2.6 |
|  | Type of Water-Repellent Resin |  | FEP | FEP | FEP | FEP | FEP | FEP | FEP | FEP | FEP |
| Total Volume of the Pores | Ratio (the Second Region/the First Region) | % | 16.8 | 27.4 | 27.4 | 42.1 | 42.7 | 6.1 | 7.2 | 42.7 | 7.0 |
|  | Ratio (the Third Region/the Second Region) | % | 86 | 48 | 48 | 40 | 40 | 420 | 345 | 95 | 275 |
|  | Total Volume (the First Region) | mL/g | 1.51 | 1.38 | 1.37 | 1.03 | 1.02 | 1.65 | 1.52 | 0.89 | 1.72 |
|  | Total Volume (the Second Region) | mL/g | 0.254 | 0.378 | 0.376 | 0.434 | 0.436 | 0.1 | 0.11 | 0.38 | 0.12 |
|  | Total Volume (the Third Region) | mL/g | 0.219 | 0.182 | 0.181 | 0.178 | 0.176 | 0.42 | 0.38 | 0.36 | 0.33 |
| Gas Diffusion Electrode | Total Thickness of Microporous Layer | μm | 33 | 53 | 53 | 28 | 28 | 28 | 28 | 28 | 28 |
|  | Gas Difusivity in the Thickness Direction | % | 29 | 27 | 27 | 27 | 27 | 29 | 32 | 29 | 29 |
|  | Gas Difusivity in the In-plane Direction | cc/min | 85 | 66 | 64 | 45 | 44 | 85 | 55 | 68 | 68 |
|  | Surface Roughness of Microporous Layer | μm | 4.4 | 3.8 | 3.9 | 6.0 | 6.1 | 7.2 | 7.8 | 8.5 | 8.5 |
|  | Power Generation Performance (@40° C.) | A/cm$^2$ | 1.32 | 1.40 | 1.37 | 1.41 | 1.37 | 1.22 | 1.19 | 1.37 | 1.1 |
|  | Power Generation Performance (@70° C.) | A/cm$^2$ | 2.31 | 2.31 | 2.25 | 2.32 | 2.29 | 2.31 | 2.22 | 2.29 | 2.18 |
|  | Power Generation Performance (@90° C.) | A/cm$^2$ | 1.75 | 1.71 | 1.68 | 1.75 | 1.73 | 1.55 | 1.43 | 1.54 | 1.54 |

The gas diffusion electrode of the present invention can be used suitably as a low-priced fuel cell which shows high gas diffusivity, good water removal performance, and high fuel cell performance in a wide temperature range thanks to the achievement of both the anti-flooding characteristic and anti-dry-out characteristic.

DESCRIPTION OF REFERENCE SIGNS

1 Electrical conducting porous substrate
2 Unwinder
3 Guide roll (non-driving)
4 First die coater 5 Second die coater
6 Back roll
7 Drying furnace
8 Sintering machine
9 Winder (driving)
10 Interleave paper
11 Unwinder (for interleave paper)
12 Ink tank
13 Liquid feeding pump
14 Filter
40 Knife-over-roll coater
41 Knife roll
42 Liquid dam
201 First microporous layer
202 Second microporous layer
203 Infiltration of the microporous layer into the electrical conducting porous substrate.
301 Mass flow controller
302 Pipe arrangement A
303 Valve A
304 Pressure controller
305 Valve B
306 Pipe arrangement B
307 Gas chamber A
308 Gas diffusion electrode sample
309 Gas chamber B
310 Pipe arrangement C
311 Gas flow meter
312 Sealing member
313 Nitrogen gas

The invention claimed is:

1. A gas diffusion electrode having a microporous layer on at least one surface of an electrical conducting porous substrate, wherein
the microporous layer has at least a first microporous layer in contact with the electrical conducting porous substrate, and a second microporous layer,
the pore size distribution of the gas diffusion electrode has a peak at least in a first region of 10 μm or more and 100 μm or less, a second region of 0.2 μm or more and less than 1.0 μm, and a third region of 0.050 μm or more and less than 0.2 μm, and
the total volume of the pores in the second region is 10% or more and 40% or less of the total volume of the pores in the first region, and the total volume of the pores in the third region is 40% or more and 80% or less of the total volume of the pores in the second region.

2. The gas diffusion electrode according to claim 1, wherein the total volume of the pores in the first region is 1.2 mL/g or more and 2.0 mL/g or less, the total volume of the pores in the second region is 0.2 mL/g or more and 0.4 mL/g or less, and
the total volume of the pores in the third region is 0.15 mL/g or more and 0.30 mL/g or less.

3. The gas diffusion electrode according to claim 1, wherein the first microporous layer and the second microporous layer contain carbon black.

4. The gas diffusion electrode according to claim 3, wherein the carbon black in the first microporous layer has a structure index of 3.0 or more, and the carbon black in the second microporous layer has a structure index of less than 3.0.

5. A gas diffusion electrode having a microporous layer on at least one surface of an electrical conducting porous substrate, wherein
the microporous layer has at least a first microporous layer in contact with the electrical conducting porous substrate, and a second microporous layer, and
the first microporous layer contains carbon black having a structure index of 3.0 or more, and the second microporous layer contains carbon black having a structure index of less than 3.0.

6. The gas diffusion electrode according to claim 1, wherein
the first microporous layer has a thickness of 10 μm or more and less than 50 μm,
the second microporous layer has a thickness of 0.1 μm or more and less than 10 μm, and
the total thickness of the microporous layer is larger than 10 μm and 60 μm or less.

7. The gas diffusion electrode according to claim 3, wherein the carbon black has an ash content of 0.1% by mass or less.

8. The gas diffusion electrode according to claim 1, wherein the gas diffusivity in the thickness direction is 30% or more.

9. The gas diffusion electrode according to claim 1, wherein the gas diffusivity in the in-plane direction is 25 cc/min or more.

10. The gas diffusion electrode according to claim 1, wherein the electrical conducting porous substrate is a carbon paper, and the carbon paper has a thickness of 220 μm or less.

11. The gas diffusion electrode according to claim 1, wherein
the second, microporous layer is located at the outermost surface, and
the surface roughness of the second microporous layer is 6 μm or less.

* * * * *